United States Patent [19]

Schirrmacher

[11] 4,165,928
[45] Aug. 28, 1979

[54] SLIDE PROJECTOR DRIVE MECHANISM FOR A CIRCULAR MAGAZINE

[75] Inventor: Roland Schirrmacher, Ulm, Fed. Rep. of Germany

[73] Assignee: Rollei-Werke Franke & Heidecke, Brunswick, Fed. Rep. of Germany

[21] Appl. No.: 931,132

[22] Filed: Aug. 4, 1978

[30] Foreign Application Priority Data

Aug. 5, 1978 [DE] Fed. Rep. of Germany ....... 2735309

[51] Int. Cl.$^2$ ............................................ G03B 23/06
[52] U.S. Cl. ................................................. 353/117
[58] Field of Search ................. 353/103, 114, 116, 117

[56] References Cited

U.S. PATENT DOCUMENTS

| | | | |
|---|---|---|---|
| 3,296,727 | 1/1967 | Liguori | 353/116 X |
| 3,554,639 | 1/1971 | Robinson | 353/117 |

FOREIGN PATENT DOCUMENTS 1115473  10/1961  Fed. Rep. of Germany ........... 353/116

*Primary Examiner*—Harry N. Haroian
*Attorney, Agent, or Firm*—Schwartz, Jeffery, Schwaab, Mack, Blumenthal & Koch

[57] ABSTRACT

Disclosed is a drive mechanism for a slide projector adapted for accepting a circular slide magazine of the type including an approximately h-shaped configuration wall having a pair of forked inner and outer wall parts in coaxial spaced relationship located near the axial end of the housing which abuts the projector, the outer wall part having on its side facing the inner wall part a plurality of recesses corresponding in number to the slide compartments. The drive mechanisms for selectively rotating the slide magazine comprises a drive member mounted for rotation on the projector housing at a location adjacent the h-shaped wall configuration of a mounted slide magazine, and at least one drive pin mounted excentrically on the drive member substantially parallel to the axis of rotation of the drive member, for projecting into the space between the inner and outer wall parts of the h-shaped configuration.

20 Claims, 9 Drawing Figures

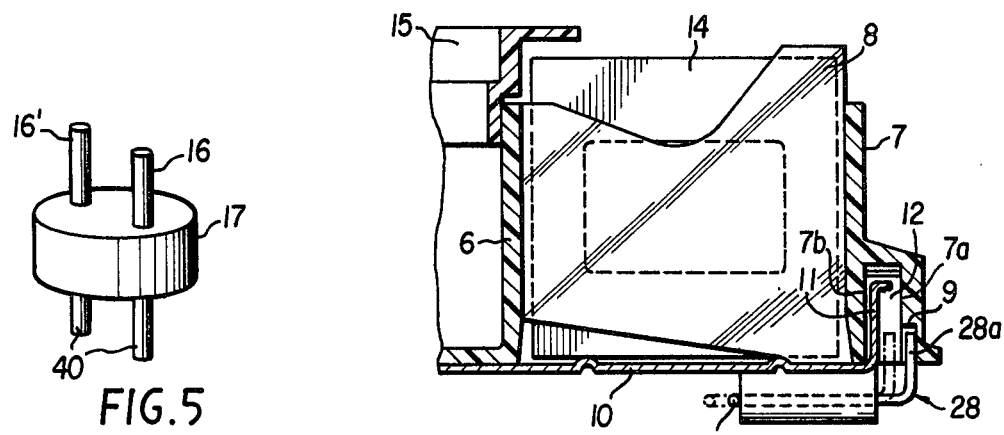
FIG.6
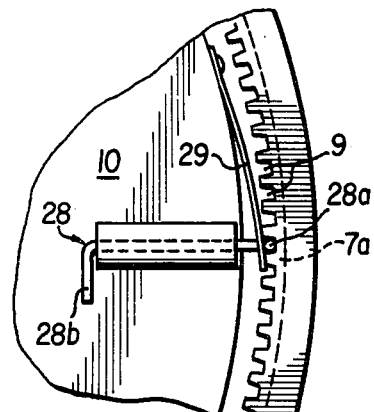
FIG.5
FIG.7
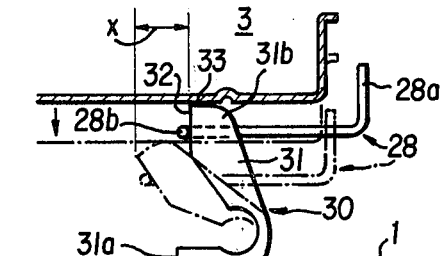
FIG.8
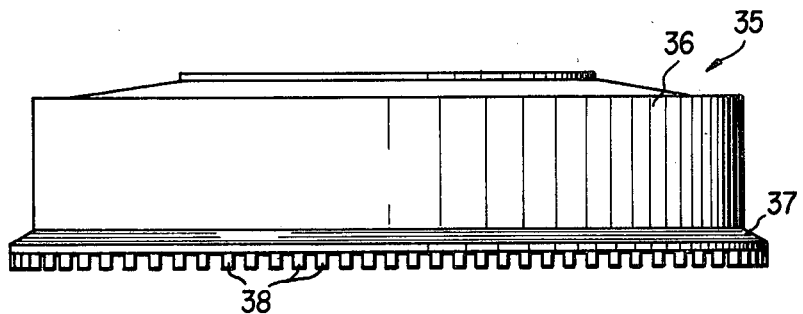
FIG.9

4,165,928

SLIDE PROJECTOR DRIVE MECHANISM FOR A CIRCULAR MAGAZINE

BACKGROUND OF THE INVENTION

The present invention pertains to a slide projector drive mechanism, and more particularly to a slide projector having a drive mechanism for a circular magazine or tray of the type which is equipped with a housing adapted to be rotatably supported on the projector and contains compartments for the slides in a circular arrangement. The external wall of the housing has an approximately h-shaped cross section, in a manner so that two forked parts of the wall are located in close proximity to the one axial side (bottom) of the housing, coaxially spaced at a distance from each other, with the outer part of the wall possessing on its side facing the inner part of the wall a plurality of recesses, corresponding in number to the number of slide compartments, these recesses being distributed uniformly over the circumference and each of them being associated with one of the compartments.

A similar slide projector with a drive mechanism for a circular magazine of the type defined above is known from German Auslegeschrift No. 1,900,326. The slide projector described in detail in German Pat. No. 1,263,342 accomplishes the stepwise rotation of a magazine by a pawl slidable in the radial direction which during its radial advance also performs a movement perpendicular thereto. The distance covered in this lateral movement represents the so-called switching step of the pawl. To rotate the magazine by means of this drive mechansim, at the bottom of the intermediate space formed by the two forked parts of the wall of the magazine housing a serrated slat or rack is arranged, the tooth pitch of which corresponds to the width of the slide compartments. Two rotatably and slidably supported switching levers engage by means of their swtiching projection the serrated slat and protrude with one leg into the slide path of the pawl in the projector. During each switching step of the pawl one leg of one of the switching levers is gripped by the pawl. In this manner, the switching lever is rotated until its switching projection engages between two of the teeth of the serrated slat and is subsequently displaced in the longitudinal direction, while the magazine housing is rotated by a distance corresponding to the width of a slide compartment. In order to prevent the rotation of the housing during the subsequent slide changing process, an indexing pin is additionally provided which under the action of a spring enters one of the recesses in the outer part of the wall of the magazine housing. In the drive mechanism a device is provided which extracts said indexing pin from the recess during the transport of the magazine and then releases the pin following the rotation of the magazine by one switching step, so that it drops into the next recess under the action of its spring, thus locking the housing in the projector with respect to rotation.

In the projector described hereinabove, the drive mechanism may rotate the circular magazine always by only one switching step, thus turning the magazine by the width of one slide compartment, so that now the next slide is located in the exchange or feed plane. If, following the slide being projected, it is desired to view not the slide following in the order of the slide magazine, but rather a slide in a certain slide compartment at an arbitrary location of the magazine, this is possible only by turning the magazine step-by-step by means of the drive mechanism until the desired slide compartment arrives in the exchange or feed plane. This step-by-step rotation of the magazine is highly time consuming and laborious, so that in most cases it will be avoided.

SUMMARY OF THE INVENTION

It is therefore an object of the present invention to provide an improved slide projector drive mechanism for a circular magazine or tray.

A particular object of the invention resides in providing an improved slide projector having a drive mechanism for a circular magazine of the type described in the introduction, which will not only turn the magazine during the normal slide-changing process, but is also capable of rotating the magazine without interruption rapidly into any position desired.

It is also an object of the invention to provide a slide projector having a drive mechanism which is designed as simply as possible, so that the projector may be produced inexpensively.

In accomplishing the foregoing objects, there has been provided in accordance with the present invention a slide projector adapted for accepting a first circular slide magazine of the type including a circular housing adapted for rotational mounting on the projector and a plurality of slide-accepting compartments uniformly spaced in circular arrangement in the housing, wherein the outer circumferential wall of the housing comprises an approximately h-shaped configuration having a pair of forked inner and outer wall parts in coaxial spaced relationship located near the axial end of the housing which abuts the projector. The outer wall part has on its side facing the inner wall part a plurality of recesses corresponding in number to the slide compartments, with each recess being associated with one of the slide compartments. The slide projector comprises (a) a projector housing for accepting the aforesaid slide magazine; and (b) a first drive mechanism for selectively rotating the slide magazine.

The present invention provides, in particular, this first drive mechanism, which comprises a drive member mounted for rotation on the projector housing at a location adjacent the h-shaped wall configuration of a mounted slide magazine, and at least one drive pin mounted excentrically on the drive member substantially parallel to the axis of rotation of the drive member, for projecting into the space between the inner and outer wall parts of the h-shaped configuration. Each drive pin is spaced from the axis of rotation of the drive member a distance sufficient to permit the drive pin to be inserted temporarily once during each rotation of the drive member into one of said recesses to displace the recess by a distance corresponding to the spacing of adjacent slide compartments, whereby the slide magazine will be rotated by a like distance.

BRIEF DESCRIPTION OF THE DRAWINGS

In the drawings:

FIG. 5 is a perspective view of a drive member from the drive mechanism having two drive pins;

FIG. 6 is a partial cross-sectional view through the circular magazine of FIG. 1 showing an arresting device for the housing;

FIG. 7 is a partial view of the circular magazine from below in FIG. 1 showing the arresting device for the housing;

FIG. 8 is a schematic representation of the device on the projector to release the magazine lock; and FIG. 9 is a side elevation of a second circular magazine for the projector.

DETAILED DESCRIPTION OF PREFERRED EMBODIMENTS

Figure 1:
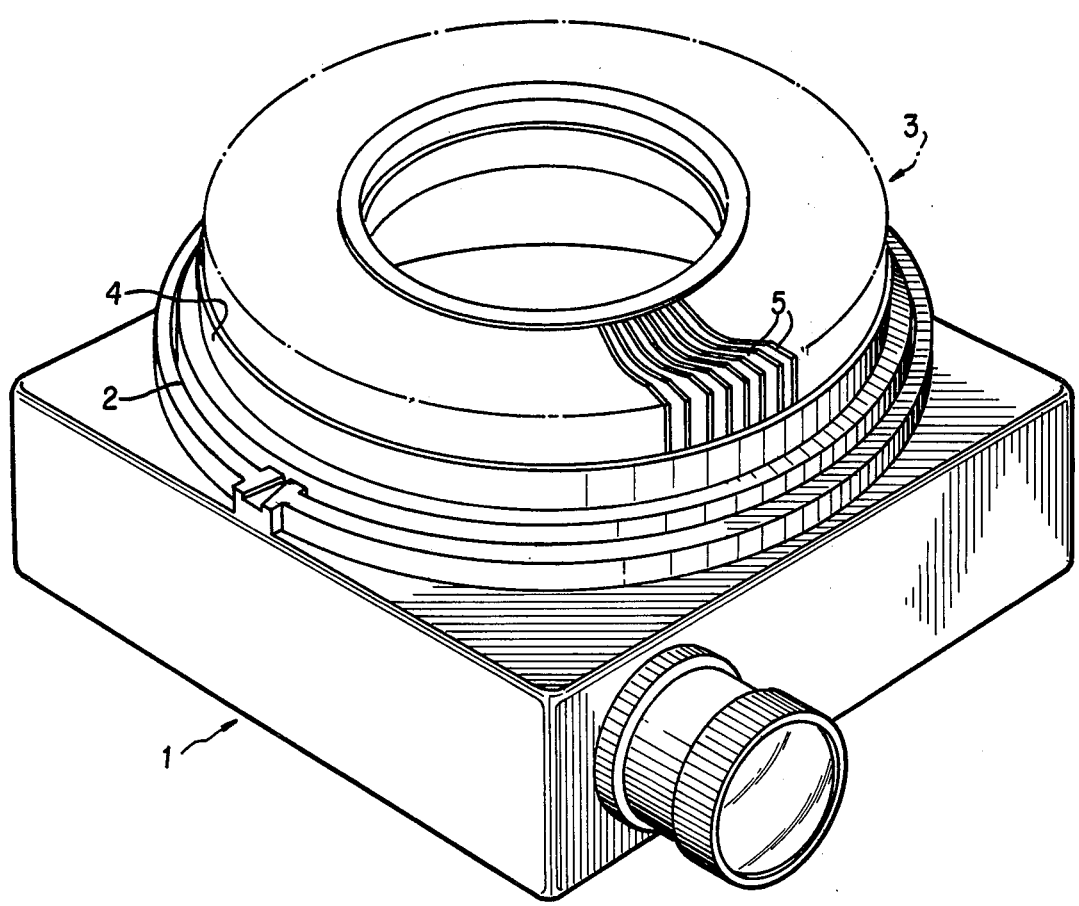
FIG. 1 is a perspective view of the projector of the invention with a horizontally inserted circular magazine.

In accordance with the invention, the drive mechanism includes a drive member selectively rotatable continuously or intermittently. The drive mechanism carries at least one excentrically arranged drive pin located parallel to its axis of rotation, with the drive pin protruding between the forked parts of the outer wall of the magazine housing when the magazine is inserted in the projector. The arrangement of the drive pin on the drive member is such that the drive pin drops temporarily into one of the recesses during each rotation of the drive member, displacing the recess by a distance corresponding to the width of a slide compartment. Because the recesses are arranged in the outer wall of the forked part of the magazine housing offset circumferentially with respect to each other by a distance corresponding to the width of a slide compartment, the drive pin will engage the next recess during a subsequent rotation and again displace that recess by the width of a slide compartment. If the drive member is driven continuously, the magazine may thus be rotated into any position desired in the shortest possible time. If, on the other hand, the drive member is driven intermittently, it will perform, in the case that it carries only a single drive pin, a full rotation during every drive phase. The recess being engaged by the pin will be displaced by the width of a slide compartment and at the end of the drive phase (i.e., following one rotation) the drive pin engages the next recess, thus locking the magazine housing against unintentional rotation during the subsequent changing of the slide.

The design of the drive mechanism according to the invention not only renders it possible to project slides rapidly, regardless of their sequence in the magazine, by providing for the rapid rotation of the magazine into any position desired and thus of any slide into the exchange or feed plane, but also secures the magazine housing after the completion of the rotation of the magazine against further turning, so that the slide change may be accomplished smoothly and without interference. A locking device to secure the housing against turning in the projector and an additional switching element to render this locking device ineffective during each transport step of the magazine are as unnecessary as are the switching levers found in the known magazine to translate the switching step into a corresponding rotation of the magazine by the width of one slide compartment. The drive mechanism of the invention is thus substantially simpler than the above-described prior art and contains fewer structural elements.

In keeping with a first embodiment of the invention, the drive member is nonrotatingly arranged on a drive shaft, with the drive shaft being operatively connected by means of a cam disk with a worm gear located on the drive shaft of a motor.

According to another embodiment of the invention, a microswitch controlled by the cam disk is provided for inactivating the motor. This inactivation of the motor occurs during intermittent operation, i.e., when the magazine is being rotated step by step, always by the width of one slide compartment, at the completion of a drive phase. Depending on the number of drive pins arranged on the drive member, this occurs either after a full rotation or after a fraction of a full rotation of the drive member.

According to a further embodiment of the invention, selectively insertable switching means for bypassing of the microswitch are provided. This measure renders the continuous drive of the drive member possible; consequently, the magazine may be rotated into any position desired without interruption.

A still further embodiment of the invention is characterized by the fact that the drive member, drive shaft, cam disk and motor are arranged on a carrier, which carrier is rotatable around an axle solidly mounted on the housing of the projector, so that the drive pin may be brought into a position outside the intermediate space formed by the forked wall parts of the magazine housing by lowering the carrier. Through this design, it is possible to disengage the drive mechanism from the magazine even when the magazine is inserted in the projector, so that the magazine may be rotated manually in order to bring a certain slide into the exchange or feed plane.

In still another embodiment, a return spring advantageously engages the carrier during the operation of the preceding embodiment, this spring biasing the carrier into the engaged position. In this manner, the drive mechanism is normally operatively connected with the magazine, when the latter is inserted, and may be temporarily lifted off the magazine by manually depressing the carrier by means of a handle engaging the carrier. Following release of the handle, the coupling of the drive mechanism and the slide magazine is automatically restored.

In another embodiment of the invention, two drive pins are provided. These drive pins are offset by 180° with respect to each other in the direction of rotation of the drive member. In this manner, the drive velocity of the circular magazine can be doubled while retaining an identical number of revolutions of the motor and the same design of the worm gear.

To enable transport of a magazine filled with slides without the slides falling out of the magazine and for reasons inherent in the projector designed for accepting such a magazine, the known circular magazine described in the introductory portion possesses a bottom plate covering the bottom end of the tray. This bottom plate is prevented from rotating when the tray is inserted in the projector. The magazine also has an indexing pin cooperating with recesses in the outer part of the wall of the housing, which is rotatable with respect to the bottom plate, with the indexing pin serving to arrest the housing in a number of positions corresponding to the number of slide compartments.

Therefore, in still another embodiment of the invention, effective means are provided to lift the indexing pin from the recesses and to block the indexing pin in this lifted position when the magazine is inserted in the projector. In this manner, the circular magazine designed in the manner described above may be used in the projector according to the invention.

A further embodiment of the invention is characterized by the fact that these indexing pin lifting means consist of a sliding member protruding into the space on the projector designed for receiving of the magazine. This sliding member engages the indexing pin when the magazine is inserted in the correct position and is capable of displacement by the magazine. This displacement extracts the indexing pin by a distance sufficient to extract the indexing pin from the range of the recesses. In this manner, upon insertion of the magazine, the lock between the bottom plate and the housing of the circular magazine is released automatically and without additional measures, so that the housing receiving the slides may be rotated relative to the bottom plate and thus relative to the exchange or feed plane of the projector. As described in the introduction, the drive mechanism of the invention itself locks the housing between two subsequent rotations of the magazine while the slide is being changed. It is therefore sufficient to constantly maintain the lock between the bottom plate and the housing in the unlocked state, when the magazine is inserted in the projector.

In an additional embodiment of the invention, the sliding member is designed as a spring element compressible upon insertion of the magazine in the direction of the axis of rotation of the magazine. The spring element has two legs, one of which is arranged in the projector by being mounted solidly on the housing and the other having two thrust edges. When the magazine is inserted, one of the thrust edges will be located adjacent to the indexing pin and the other adjacent to the bottom plate. Upon insertion of the magazine, the spring element is compressed, with the thrust edge engaging the indexing pin being displaced toward the axis of rotation of the magazine by a certain distance. The thrust edge takes the indexing pin along in its displacement so that the latter becomes disengaged from the recesses in the outer part of the housing wall. In the case of a circular magazine arranged horizontally in the projector, the weight of the circular magazine filled with slides is sufficient to compress the spring element and to maintain it in its compressed state, so that the lock between the bottom plate and the housing is permanently released during the retention of the circular magazine in the projector.

A preferred embodiment of the invention is characterized by the fact that a gear is operatively connected with the drive motor provided for the drive member. This gear is arranged in the projector so that it engages a circularly or annularly arranged transport means provided to rotate a second circular magazine of an identical diameter but having a different number of slide compartments, which may be inserted to replace the first circular magazine. Consequently, a circular magazine which, because of its fewer compartments of greater width in order to accept glass-framed slides, requires an additional switching step of the drive mechanism of the projector, may be operated by the drive mechanism of the present invention without the need of altering the construction of the latter.

According to another embodiment of the invention, the gear is coupled with the drive shaft of the drive member, and in an advantageous further development, an intermediate drive is arranged between the drive shaft and the gear. In this manner, during intermittent operation of the drive mechanism of the invention, the gear may be driven so that the second circular magazine with its lesser number of compartments is always rotated by the angle of rotation necessary to bring subsequent slides in sequence into the exchange or feed plane.

According to still another embodiment of the invention, the gear and the intermediate drive are arranged on the carrier, which makes it possible to rotate the second circular magazine by hand, by disengaging the drive mechanism.

In another embodiment of the invention, the drive member is releasable from the drive shaft, preferably by being secured to the drive shaft by means of a plug connection. Because of this arrangement, the drive member carrying the drive pins may be pulled off the drive shaft so that it does not interfere with the insertion of the second type of magazine. This known second type of circular magazine differs from the known first type of magazine by the fact that its housing does not have the forked parts on the lower part of the wall which is closed off by the bottom plate, but instead comprises an annular flange having cylindrical cams or teeth arranged on the front side of said flange uniformly over the circumference at intervals having the width of a slide compartment. These cams or teeth represent the means of transport to rotate the magazine in the projector.

Figure 2:
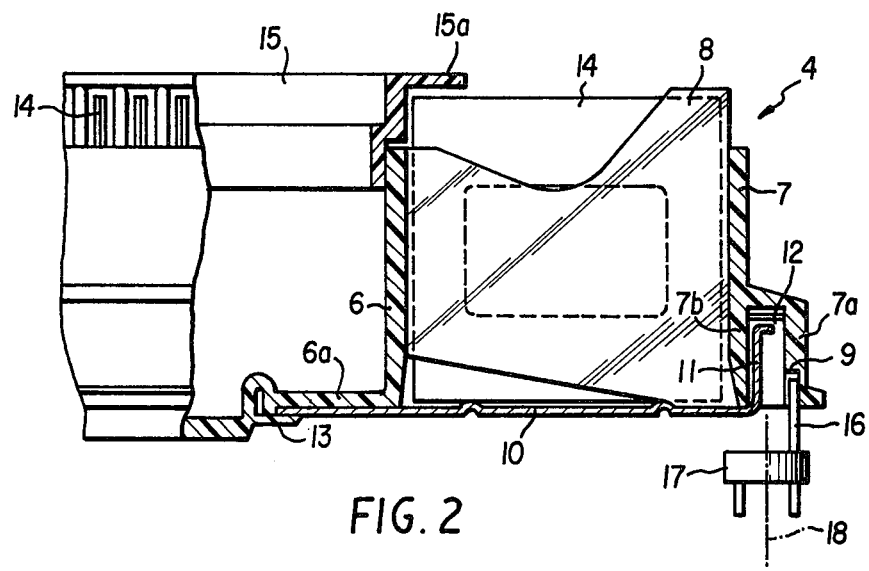
FIG. 2 is a partial cross-sectional view of the circular magazine of FIG. 1 in a radial plane.

Referring now to the drawings, in FIG. 1 a projector, designated by 1, has on its upper side a magazine receiving space 2 to accept a conventional circular magazine 3, so that the rotational axis of the circular magazine 3 is aligned vertically. The circular magazine 3 consists of a housing 4 containing annularly arranged compartments 5 to receive the slides. In the radial direction, the slide compartments 5 are bounded by a cylindrical inner wall 6 and an outer wall 7 which is concentric with said inner wall 6 of the magazine housing 4. The inner wall 6 is closed off on one end and forms a flange-shaped base 6a. The inner wall 6 and the outer wall 7 are connected to each other by partitions 8 which act as radial spacers; together they form the slide compartments 5. The outer wall 7 of the magazine housing 4 has an approximately h-shaped cross section (FIG. 2), so that in the proximity of the lower axial side (bottom) of the magazine housing 4, two forked parts of the wall, 7a and 7b, extend coaxially and in spaced relationship. The part 7a of the wall, on its side facing the part 7b of the wall, contains the recesses 9 which correspond in number to the number of slide compartments 5 and are distributed uniformly over the circumference, so that each of the recesses 9 is associated with one of the slide compartments 5. The bottom side of the magazine housing 4 is covered with a bottom plate 10, which consists of an annular disk with a raised outer flange 11 on its circumference. The flange protrudes into the space 12 which is open toward the bottom and is enclosed by the forked wall parts 7a, 7b. The bottom plate is mounted rotatably upon the bottom side of the magazine housing 4 and is secured by means of an annular holding member 13 to the flange-shaped base 6a. The slides 14 inserted in the slide compartments 5 are maintained in said slide compartments by means of a retainer ring 15 connecting with the upper end of the inner wall 6. The outwardly angled edge 15a of said retainer ring extends past the slide compartments 5, thus keeping the slides from dropping out of the compartments. The drive pin 16 of a drive member 17 protrudes into the recesses 9 of the outer forked wall part 7a, as shown schematically in FIG. 2. The drive pin 16 extends parallel to the axis of rotation 18 of the drive member 17 and is arranged excentrically on said drive member 17. The drive member 17 may be rotated selectively in a continuous or intermittent manner around its axis of rotation 18. In the process, the drive pin rotates in the intermediate space 12, formed by the forked parts of the wall 7a and 7b. During each rotation of the drive member 17, the drive pin 16 enters into one of the recesses 9 and displaces the latter by a distance corresponding to the width of one slide compartment 5, thereby causing rotation of the magazine housing 4.

Figure 3:
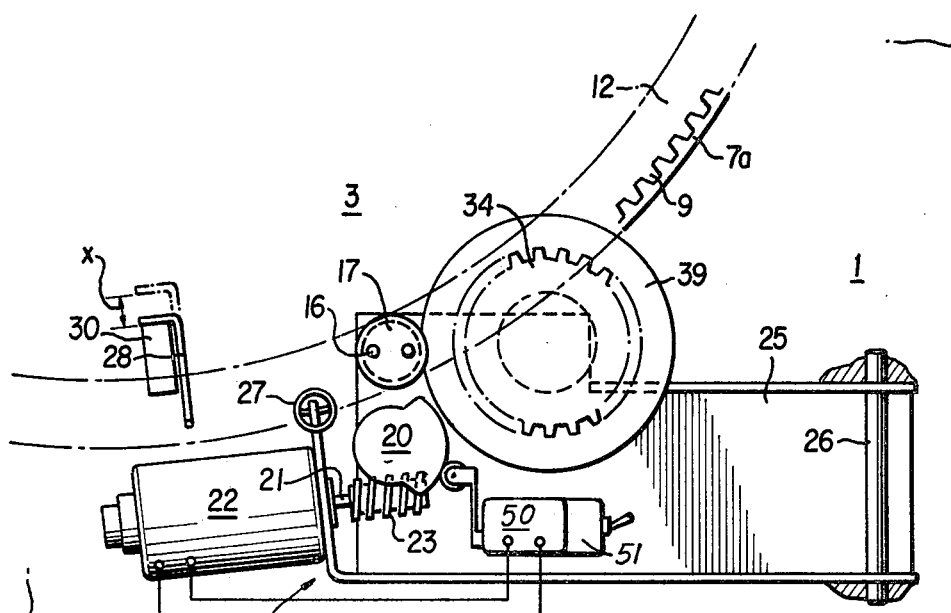
FIG. 3 is a schematic representation of the top view of the drive mechanism of the projector.

The drive member 17 is arranged in a rotationally fixed manner on a drive shaft 19 (FIG. 4), said drive shaft being operatively connected by means of a cam disk 20 with a worm gear 23, mounted on the drive shaft 21 of a motor (FIG. 3). Arranged in the circuit of the electrically powered motor 22 is a microswitch 50 (schematically illustrated) which is controlled by the cam disk 20 in such a manner that it deactivates the motor during intermittent operation after a certain rotation, thus terminating the drive phase. If the drive member 17, as in FIG. 2, carries only one drive pin 16, then the motor 22 is deactivated after one full rotation. If, however, the drive member 17, as in FIG. 5, carries two drive pins 16, offset with respect to each other by 180° in the direction of the rotation of the drive member 17, then the microswitch deactivates the drive motor following one-half of a full rotation of the drive member 17. For the continuous operation of the circular magazine 3 in such a manner that a slide stored in any of the slide compartments 5 may be brought into the exchange or feed plane of the projector, there is provided switching means 51 (schematically illustrated) which may be selectively engaged to bypass the microswitch. The motor 22 then stops only after the switching means is withdrawn.

Figure 4:
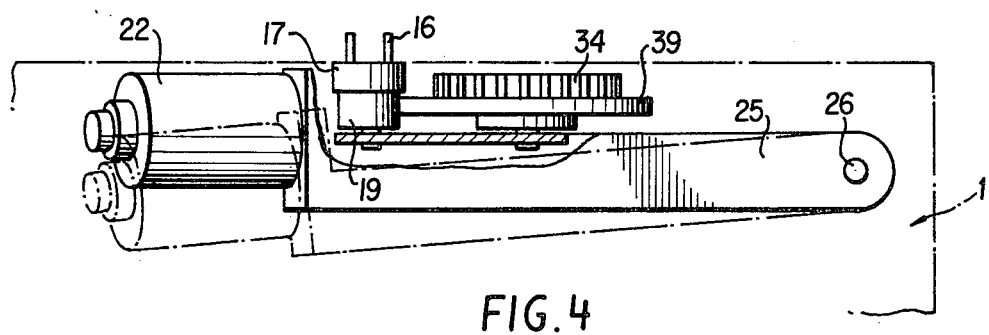
FIG. 4 is a schematic representation of the front elevation of the drive mechanism in FIG. 3.

The entire drive mechanism 24 of the projector 1, comprising the drive member 17, drive shaft 19, cam disk 20, motor 22 with its drive shaft 21 and the worm gear 23, is arranged on a carrier 25, which may be rotated around an axle 26 rigidly mounted on the housing of the projector, so that by lowering the carrier 25 the drive pin 16 may be brought into a position outside the intermediate space 12 defined by the forked wall parts 7a, 7b of the magazine housing 4. This rotation of the carrier 25 may be executed manually by means of a handle, not shown. The position occupied after this rotation by the carrier 25 and the drive mechanism 24 is shown in FIG. 4 by phantom lines. The carrier 25 is engaged by a return spring 27, which has its other end fastened to the projector 1. The return spring 27 acts against the lowering of the carrier 25 and the mechanism 24 so that following release of the handle the carrier 25 and the mechanism 24 are automatically returned to their initial setting in which the drive mechanism 24 is coupled with the circular magazine 3 and the drive pin 16 of the drive member 17 protrudes into the intermediate space 12 of the magazine housing 4. For the sake of clarity, the circular magazine 3 is merely indicated generally in FIG. 3, while the intermediate space 12 formed by the forked parts 7a and 7b of the wall and the recesses 9 in the outer part 7a of the wall are shown in detail.

As shown in FIGS. 6 and 7, the circular magazine 3 carries on its bottom plate 10 an indexing pin 28, which is located on the bottom plate 10 of the circular magazine 3 in a radially displaceable manner. The indexing pin has both ends bent at an angle (28a, 28b). The bent angle 28a protrudes into the intermediate space 12 defined by the forked parts 7a and 7b of the wall and is pressed into one of the recesses 9 in the outer forked part 7a of the wall by the action of a spring 29 secured to the bottom plate 10. The other end 28b of the indexing pin 28 is bent at a right angle and is parallel to the bottom plate 10. It is the function of the indexing pin 28 to keep the bottom plate 10 and magazine housing 4 releasably in a slide storage position, in which the two parts cannot be rotated relative to each other in said position and in which a passage opening (not shown) for the slides 14 in the bottom plate 10 is occupied by a slide compartment 5, into which no slide 14 should be inserted.

Means are provided in the projector 1 for releasing the lock of the bottom plate 10 and the magazine housing 4 effected by the indexing pin 28, these means becoming effective upon the insertion of the circular magazine 3 into the projector 1 by raising the indexing pin 28 from the recesses 9 and blocking the indexing pin in this raised position. As schematically shown in FIG. 8, these means comprise a sliding member 30 protruding into the magazine receiving space 2 of the projector and engaging the indexing pin 28 upon the insertion of the magazine in its correct position. The sliding member is displaceable by the circular magazine 3, with carriage of the pin 28 along, by a distance x sufficient to withdraw the indexing pin 28 from the area of the recesses. In the present embodiment, the sliding member 30 is designed in the form of a spring element 31 having two legs. When the circular magazine 3 is inserted, the spring 31 is compressed in the direction of the axis of rotation of the magazine 3. One leg 31a of said spring element is arranged in the projector 1 by being secured to the housing, while the other leg 31b possesses two thrust edges 32 and 33 in an arrangement perpendicular to each other. Upon insertion of the circular magazine 3 into the projector 1, one thrust edge 32 will come to lie against the indexing pin 28 and the other thrust edge 33 against the bottom plate 10 of the circular magazine 3. In FIG. 3, the position of the spring element 31 with the circular magazine not inserted is indicated by a solid line, and the position of said spring element with the circular magazine 3 inserted in the projector 1 is indicated by phantom lines. When the circular magazine 3 is inserted in the projector 1, the weight of said circular magazine 3 filled with slides 14 will compress the spring element 31, thus displacing the indexing pin 28 by a distance x in the radial direction, so that its bent end 28a is withdrawn from the recess 9 and so that the housing 4 and the bottom plate 10 of the circular magazine 3 are automatically unbolted. As long as the circular magazine 3 remains in the projector 1, the locking of the bottom plate 10 and the magazine housing 4 effected by the indexing pin 28 is permanently released, with the lock becoming automatically effective upon the removal of the circular magazine 3 from the projector 1.

Because the circular magazine 3 must be inserted in a certain position in the projector 1 so that the bottom plate 10 is held in the projector stationarily with respect to rotation, upon proper insertion of the circular magazine 3 in the projector 1 the bent end 28b of the indexing pin 28 automatically engages the spring element 31, so that the releasing device constituted by the spring element 31 for the indexing pin 28 operates in a reliable manner.

The drive mechanism 24 of the projector 1 for the circular magazine 3 has an additional gear wheel 34

(FIG. 3) which is operatively connected with the motor 22 for the drive member 17. The gear wheel 34 is arranged in the projector 1 so that it engages an annularly arranged means of transport to rotate a second circular magazine 35 inserted in the projector 1 in exchange for the circular magazine 3, said second magazine 35 having the same diameter but a different number of slide compartments compared to the first circular magazine 3. Such a second circular magazine 35 is shown in FIG. 9. This circular magazine 35 again has a housing 36 rotatable with respect to a bottom plate (not visible) which closes off the lower side. The cylindrical outer wall of said housing 36 does not, however, carry forked parts of the wall as does the first circular magazine 3, but instead an annular flange 37, with cylindrical cams or teeth 38 arranged uniformly over the circumference of the annular flange 37, at intervals corresponding to the width of the slide compartments of the circular magazine 35. The cams 38, which are aligned parallel to the axis of rotation of the second circular magazine 35, represent the means of transport to rotate the circular magazine 35 and are engaged upon the insertion of the circular magazine 35 into the projector 1 by the teeth of the gear wheel 34. The gear wheel 34 is coupled with the drive shaft 19 of the drive member 17, with insertion of an intermediate drive 39. The intermediate drive is designed so that during a drive phase of the motor 22 (i.e., during a full or half rotation of the drive member 17, corresponding to one or two drive pins 16 being arranged on the drive member 17) the gear wheel 34 is rotated by an angle which will result in the rotation of the circular magazine 35 by the width of one slide compartment. If the first circular magazine, with an identical diameter, has a capacity of 140 slides and the second circular magazine a capacity of 80 slides, and if the drive member 17 equipped with two drive pins 17 performs a one-half rotation during intermittent operation of the drive mechanism 24 in each drive phase of the motor 22, then the intermediate drive is designed so that the gear wheel performs ⅛ of a rotation. The tooth division of the gear wheel 34 is obviously adapted to the intervals of the cams 38. The gear wheel 34 and the intermediate drive 39 are also arranged on the carrier 25 so that, by the manual rotation of the carrier 25, the gear wheel 34 is disengaged from the cam 38, thus disengaging the drive mechanism 24 from the circular magazine 35, whereupon the circular magazine 35 may be freely rotated manually in the projector 1. Because, as mentioned before, the housing 35 has no forked parts on its wall, but as an approximate substitute carries the annular flange 37 with the drive cams 38, the drive pin(s) 16 will hinder the insertion of the circular magazine 35 into the projector 1. For this reason, the drive member 17 is made releasable from the drive shaft 19. This is realized by means of a plug connection, which consists of two plug pins 40 diametrically arranged on the bottom side of the drive member (FIG. 5) and corresponding bores on the front side of the drive shaft 19. When the second circular magazine 35 is to be inserted in the projector, the drive member 17 must be pulled off the drive shaft 19, whereupon the drive mechanism 24 will drive the circular magazine 35 by way of the gear wheel 34 and the cams 38, either intermittently or continuously. If, on the other hand, the projector 1 is to be operated with the first circular magazine 3, then prior to the insertion of the circular magazine 3, the drive member 17 must be pushed onto the drive shaft 19 in the manner illustrated in FIGS. 3 and 4. The gear wheel 34 is arranged so that it does not interfere with the drive of the circular magazine 3, but runs idly with the drive.

What is claimed is:

1. A slide projector adapted for accepting a first circular slide magazine of the type including a circular housing adapted for rotational mounting on the projector and a plurality of slide-accepting compartments uniformly spaced in circular arrangement in the housing, wherein the outer circumferential wall of the housing comprises an approximately h-shaped configuration having a pair of forked inner and outer wall parts in coaxial spaced relationship located near the axial end of the housing which abuts the projector, the outer wall part having on its side facing the inner wall part a plurality of recesses corresponding in number to the slide compartments, with each recess being associated with one of the slide compartments, said slide projector comprising:
   (a) a projector housing for accepting the aforesaid slide magazine; and
   (b) a first drive mechanism for selectively rotating the slide magazine, said drive mechansim comprising
      a drive member mounted for rotation on said projector housing at a location adjacent the h-shaped wall configuration of a mounted slide magazine, and
      at least one drive pin mounted excentrically on said drive member substantially parallel to the axis of rotation of said drive member, for projecting into the space between the inner and outer wall parts of the h-shaped configuration, each drive pin being spaced from the axis of rotation of said drive member a distance sufficient to permit the drive pin to be inserted temporarily once during each rotation of the drive member into one of said recesses to displace said recess by a distance corresponding to the spacing of adjacent slide compartments, whereby the slide magazine will be rotated by a like distance.

2. A slide projector as defined by claim 1, further comprising means for selectively rotating said drive member continuously or intermittently.

3. A slide projector as defined by claim 2, wherein said selective rotating means comprises a motor associated with said projector housing, a drive shaft to which said drive member is fixedly connected, and means including a cam disk for transmitting rotation from said motor to said drive shaft.

4. A slide projector as defined by claim 3, wherein said rotation transmission means comprises a worm gear connected to the drive shaft of said motor for driving said cam disk and wherein said cam disk directly contacts said drive shaft.

5. A slide projector as defined by claim 3, wherein said selective rotating means further comprises switching means, controlled by rotation of said cam disk, for deactivating said motor.

6. A slide projector as defined by claim 5, wherein said switching means comprises a microswitch.

7. A slide projector as defined by claim 5, wherein said selective rotating means further comprises switching means, selectively insertable, for bypassing said deactivation switching means.

8. A slide projector as defined by claim 3, further comprising means, including a carrier member for said selective rotating means pivotably mounted on said projector housing, for selectively moving said drive pin to a position outside of the space between the inner and outer wall parts of the h-shaped configuration by pivoting said carrier member.

9. A slide projector as defined by claim 8, wherein said selective drive pin moving means further comprises a return spring acting on said carrier member.

10. A slide projector as defined by claim 1, wherein said drive mechanism comprises two of said drive pins offset by 180° in the direction of rotation of said drive member.

11. A slide projector as defined by claim 1, in which the slide magazine includes a bottom plate which is rotatably connected to the magazine and an indexing pin displaceably mounted on the bottom plate cooperating with the recesses in the outer wall part of the magazine housing for preventing relative rotation of the bottom plate and the circular housing, and wherein said projector further comprises means for displacing the indexing pin out of the recesses upon insertion of the magazine into the projector, thereby permitting relative rotation of the bottom plate and the circular housing.

12. A slide projector as defined by claim 11, wherein said indexing pin displacement means comprises a movable shifting member mounted on said projector so as to protrude into the space between the inner and outer wall parts of the magazine and to abut against the indexing pin when the magazine is inserted, said shifting member being displaced upon insertion of the magazine to thereby also displace the indexing pin.

13. A slide projector as defined by claim 12, wherein said shifting member comprises a spring element having a first leg attached to the projector housing and a second leg including a first thrust edge adapted to abut with the indexing pin and a second thrust edge adapted to abut with the magazine, said spring element being compressible in the direction of the magazine axis by the forces acting on said second thrust edge during insertion of the magazine, whereby said second leg is displaced radially with respect to the magazine.

14. A slide projector as defined by claim 13, further comprising a second drive mechanism for rotating a second type of circular slide magazine having the same diameter but a different configuration and a different number of slide compartments from the first type of circular slide magazine, said second type of slide magazine including toothed driving means around its circumference.

15. A slide projector as defined by claim 14, wherein said second drive mechanism comprises a drive gear mounted on said projector for cooperating with the toothed driving means on the magazine and means, including said motor, for selectively rotating said drive gear.

16. A slide projector as defined by claim 15, wherein said drive gear is coupled with said drive shaft for said drive member.

17. A slide projector as defined by claim 16, wherein said drive gear is coupled via an intermediate driving means.

18. A slide projector as defined by claim 17, wherein said drive gear and said intermediate driving means are mounted on said carrier.

19. A slide projector as defined by claim 15, further comprising means for releasably attaching said drive member to said drive shaft, whereby said drive member can be removed when a slide magazine of the second type is inserted into the projector.

20. A slide projector as defined by claim 19, wherein said releasable attachment means comprises a plug-type connector between said drive member and said drive shaft.

* * * * *

UNITED STATES PATENT OFFICE
CERTIFICATE OF CORRECTION

Patent No. 4,165,928      Dated August 28, 1979

Inventor(s) Roland SCHIRRMACHER

It is certified that error appears in the above-identified patent and that said Letters Patent are hereby corrected as shown below:

Please correct the "FOREIGN APPLICATION PRIORITY DATE"

to read:   -- August 5, 1977 --.

Signed and Sealed this

First Day of January 1980

[SEAL]

Attest:

SIDNEY A. DIAMOND

Attesting Officer      Commissioner of Patents and Trademarks